United States Patent [19]

Filleau

[11] Patent Number: 5,032,998
[45] Date of Patent: Jul. 16, 1991

[54] SYSTEM AND METHOD FOR UPDATING IN REAL TIME A REFERENCE POSITION OF AN OSCILLATING OBJECT

[75] Inventor: Jean-Bernard Filleau, Castanet Tolosan, France

[73] Assignee: Bendix Electronics S.A., Toulouse, France

[21] Appl. No.: 199,215

[22] Filed: May 26, 1988

[30] Foreign Application Priority Data

May 27, 1987 [FR] France ............... 87 07448

[51] Int. Cl.$^5$ ............... G06F 15/20; B62D 1/28
[52] U.S. Cl. ............... 364/424.05; 364/424.01; 364/571.05; 364/571.02; 364/559; 280/91; 180/142
[58] Field of Search ............... 364/424.05, 424.01, 364/571.02, 571.05, 431.06, 487, 450, 559; 340/73, 22; 280/91, 707; 180/142, 79.1

[56] References Cited

U.S. PATENT DOCUMENTS

| 4,142,493 | 3/1979 | Schira | 364/431.06 |
| 4,470,124 | 9/1984 | Tagami et al. | 364/571.02 |
| 4,541,049 | 9/1985 | Ahlbom | 364/450 |
| 4,559,602 | 12/1985 | Bates, Jr. | 364/487 |
| 4,566,711 | 1/1986 | Koizumi et al. | 280/91 |
| 4,598,381 | 7/1986 | Cucci | 364/571.05 |
| 4,647,057 | 3/1987 | Furukawa et al. | 280/91 |
| 4,662,466 | 5/1987 | Eto et al. | 180/142 |
| 4,713,767 | 12/1987 | Sato et al. | 364/571.02 |
| 4,720,791 | 1/1988 | Daido | 364/571.05 |
| 4,773,498 | 9/1988 | Eto et al. | 180/79.1 |
| 4,789,041 | 12/1988 | Takeshima et al. | 364/424.05 |
| 4,792,783 | 12/1988 | Burgess et al. | 340/22 |

Primary Examiner—Parshotam S. Lall
Assistant Examiner—V. Trans
Attorney, Agent, or Firm—Russel C. Wells; George L. Boller

[57] ABSTRACT

An angular reference position, VNO, of an oscillating shaft movable about this angular position is sensed. From N samples and from a stored value being a known angular reference position, an adjustment value is obtained and the stored known angular reference position is corrected as a function of the adjustment value.

7 Claims, 2 Drawing Sheets

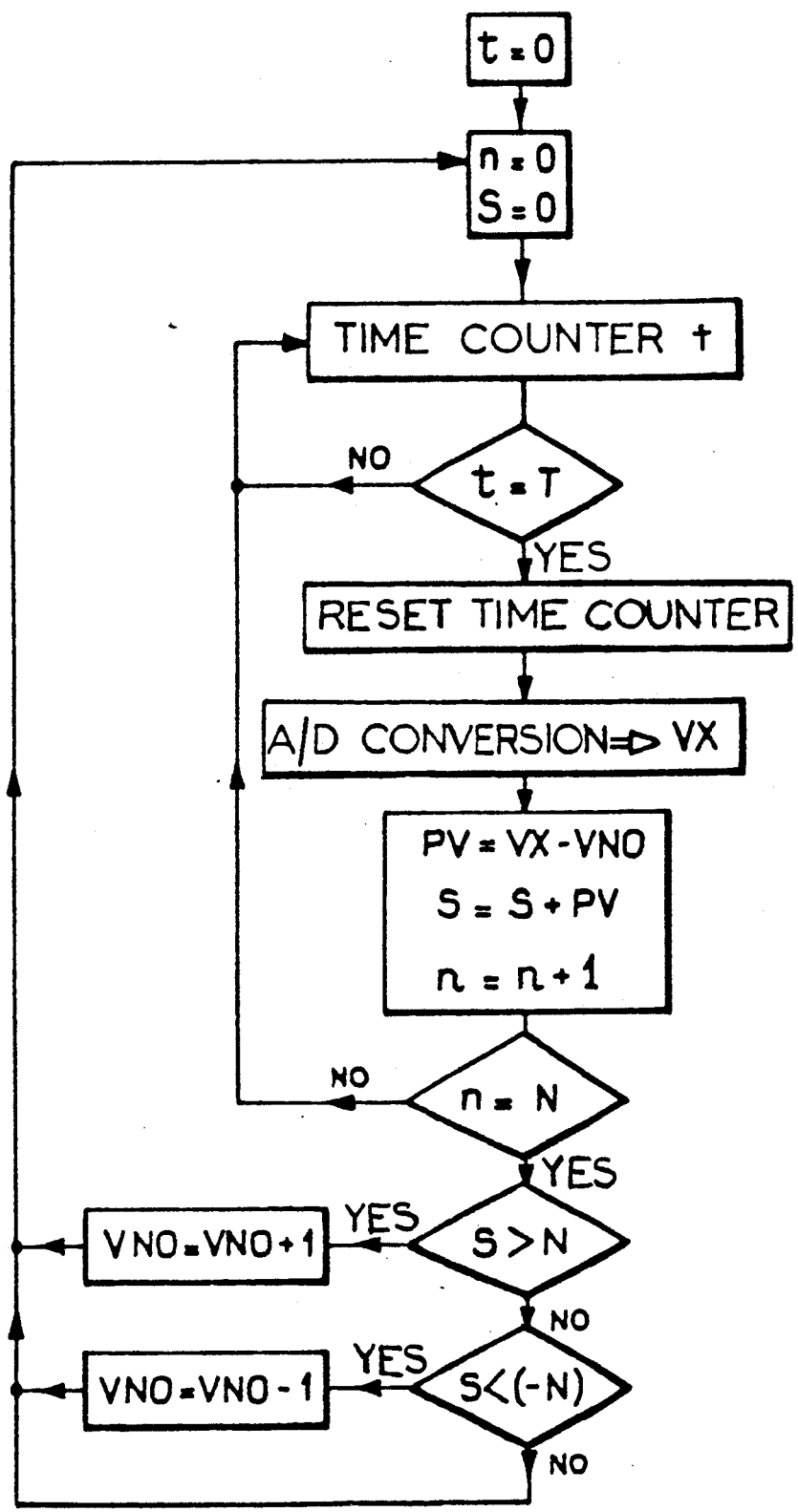
FIG_3

SYSTEM AND METHOD FOR UPDATING IN REAL TIME A REFERENCE POSITION OF AN OSCILLATING OBJECT

The present invention relates to a system or device and a method or process for the determination of a reference position of a moving or rotating object in movement about this position and, more particularly, to such a process and such a device devised to register a central angular reference position of a shaft oscillating in rotation about this position, such as a shaft forming part of the steering mechanism of an automobile vehicle.

Modern automobile vehicles are known, in which a sensor of the absolute angular position of the steering wheel supplies a signal representing this position to an electronic computer for controlling devices on board the vehicle, such as power-assisted steering or adaptive suspension, etc . . .

The mechanical mounting of such a sensor must be carried out with a high degree of precision with regard to the registering of the "zero" angular position or reference position representing the neutral position of the steering wheel, if it is desired to avoid seeing the measurements obtained from the signal supplied by the sensor being impaired by errors due to a defective regulation.

When, indeed, all the precautions have been taken for the purpose of guaranteeing this setting with the necessary precision in the course of the mounting of the sensor, this reference position would nevertheless be subjected to drifts during the life of the vehicle. These drifts being due, for example, to a change of the tires, to an intervention concerning the regulation of the parallelism of the wheels, etc. . . These drifts then affect the signal delivered by the sensor and, as a result of this, the correct operation of the device which utilizes this signal in order to control the operation of a power-assisted steering mechanism or of an adaptive suspension, for example.

U.S. Pat. No 4,633,214 discloses a device for detecting the central value of the steering angle of a vehicle, associated with an apparatus for controlling the return movement on extinction of the luminous indicators of changes of direction which are activated by the driver. The device is devised to filter parasitic signals capable of unduly affecting this central value, which is maintained and updated by means of an analog integrating circuit incorporating a resistor and a capacitor. On account of its particular intended purpose, the described device does not make use of an on-board digital computer, such as those which are found in the devices for controlling the power-assisted steering mechanism or adaptive suspensions.

The specific object of the present invention is to provide a process and to construct a device for determining and updating the reference position of a moving object such as a Steering column of an automobile vehicle. The device utilizes a part of the computing power, especially statistical, of a digital computer present within the vehicle and forming part of a device for controlling an item of equipment such as a power-assisted steering mechanism or an adaptive suspension. This device itself utilizes a signal supplied by a position sensor sensing the angular position of the steering column.

A further object of the present invention is to provide such a process and to construct such a device which are suitable to permit a simplification of the mounting of the position sensor.

A yet further object of the present invention is to execute a continuous updating of the registering of the reference position of the moving object, which takes account of the accidental drifts which may affect the movement of the moving object, in an automatic manner This object of the invention, as well as others which will become evident hereinbelow, are achieved with a process for the determination of a reference position of a moving object in movement about this position, - - - according to which a stored VNO measurement value of the reference position is compared with a value of this position estimated from current measurements, and the stored value is corrected as a function of the result of the comparison, wherein a) the current measurement VX of the position of the moving object is sampled, b) from this sampling and from the stored VNO value an estimate is obtained of the position of this value in relation to a computed value of the reference position, obtained from the analysis of the samples taken into account, c) the stored VNO value is corrected as a function of the estimate made and, d) the steps a) to c) are iteratively repeated.

For the implementation of this process, the invention permits the construction of a device which comprises, in combination, a sensor providing a signal representing the instantaneous position of the moving object, means for sampling the signal delivered by the sensor, storage means for storing the VNO measurement value of the reference position of the moving object, computing means for processing the sampling and obtaining therefrom an estimate of the position of the stored VNO value in relation to the current measurement value of the reference position which results from the processing of the samples, means for correcting the stored VNO value as a function of the result of the estimate made, and means for iterating the sampling and the computations taking into account the last stored VNO value In the accompanying drawing, which is given purely by way of example:

FIG. 3 represents the organigram of a programme executed by a computer forming part of the device of FIG. 1, for the implementation of the process according to the invention.

The invention is illustrated in its application to the determination of the neutral position of the steering wheel of an automobile vehicle. It is, however, clear that this application is not limiting, and others will moreover be quoted hereinbelow, by way of example.

Figure 1:
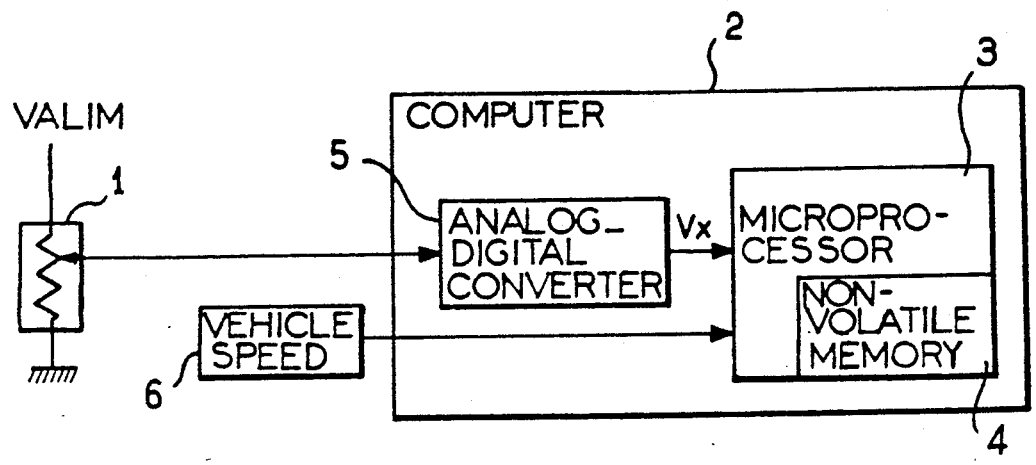
FIG. 1 is a diagram of the device according to the invention.

Reference is made to FIG. 1 of the drawing, which represents diagrammatically the organization of the device according to the invention, in a preferred embodiment. An angular position sensor 1, for example a potentiometric potentiometer sensor, is mounted in the steering mechanism of an automobile vehicle in order to permit the determination of the position of the steering wheel of this vehicle. This position is an essential parameter of the computations executed by the devices for controlling the power-assisted steering or adaptive suspension of certain modern automobile vehicles.

The sensor 1 therefore supplies a signal which feeds a digital computer 2 forming part of such a control device. This computer comprises a microprocessor associated, in particular, with a non-volatile memory 4, of the assisted RAM or EEPROM type, for example. An analog/digital converter 5, fed by a voltage signal V delivered by the potentiometric sensor 1, transmits to the microprocessor 3 digitalized information representing the amplitude of this voltage signal, which itself represents the absolute angular position of the steering wheel, in relation to a reference position which the invention aims at determining and at updating by utilizing, to this end, the computing means set forth hereinabove.

Figure 2:
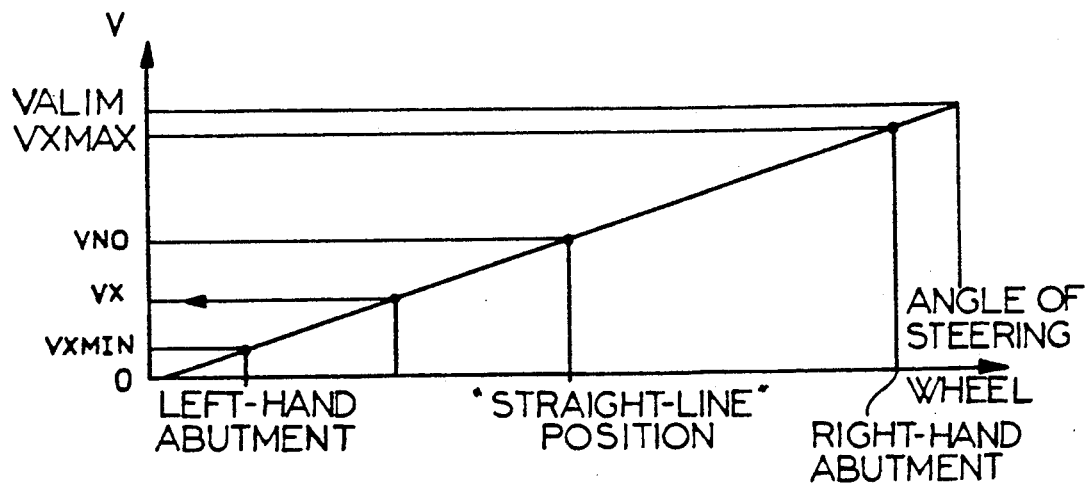
FIG. 2 is a graph illustrating the operation of a position sensor forming part of the device of FIG. 1

At this point of the description of the invention, it is necessary to concentrate for a moment on the characteristics of the signal delivered by the sensor 1, in conjunction with the examination of the graph of FIG. 2, which represents the voltage V of the signal as a function of the angle of the steering wheel.

The signal, of current value VX, varies between values VXMIN and VXMAX corresponding respectively to the extreme positions of the steering wheel which are defined by mechanical "left" and "right" abutments respectively, the position of the steering wheel when the vehicle travels in a straight line corresponding to a value VNO of the signal of the sensor For the sake of good comprehension of the present invention, it is essential to observe that, in the application of this invention to the determination of the position of the steering wheel of an automobile vehicle traveling normally (especially with a sufficient speed), the difference:

$$PV = VX - VNO$$

is at a mean value of zero, regardless of what may be the sinuosity of the travel of the vehicle In other words, the sum, over time, of the amplitudes of the "right" movements of the steering wheel is statistically equal to that of the "left" movements of the steering wheel, if the interval of time selected for the computation of these sums is sufficiently long for it to be possible for the laws of statistics to be applied Under these conditions, VNO is the amplitude of the signal of the sensor which corresponds to a reference position of the steering wheel from which measurements are made of the amplitudes of the left and right movements of the steering wheel which, when added algebraically, gives a sum which is statistically zero. According to the invention, a statistical computation is used to determine this value VNO by taking this observation as a basis. Thus, release is obtained from the constraints of precision which renders onerous the setting of the sensor when, traditionally, the reference position of the sensor and of the steering wheel is registered by a mechanical setting of the reference position of the sensor. Moreover, the continuous statistical determination according to the invention, of a reference position of the steering wheel takes into account automatically drifts, over time, of this reference position, these being drifts which could be corrected traditionally only by new mechanical settings of the sensor.

The microprocessor 3 of the computer 2 of the device according to the invention permits the execution of the computations necessary for the determination of the VNO value registering the reference position of the steering wheel As has been indicated hereinabove, it is not necessary that this microprocessor should be specific to the device according to the invention, and it is possible to utilize for these computations a part of the computing power of a microprocessor forming part of a device for controlling a power-assisted steering mechanism or an adaptive suspension, the operation of which depends, in any event, upon the signal delivered by the position sensor 1.

The potentiometric sensor 1 supplies a signal to the analog converter which converts this signal into a digital value VX transmitted to the microprocessor 3, which computes the difference:

$$PV = VX - VNO$$

this value representing the "steering wheel" angle, which is positive for a right-hand turn, negative for a left-hand turn and zero in a straight line.

The computer is activated by the ignition key of the vehicle According to a feature of the present invention, in the course of the production of the computer an approximate initial value of VNO is written in the non-volatile memory 4. This value, for example corresponding to VALIM/2, VALIM being the supply voltage of the potentiometric sensor 1, will be modified by the computer as a function of the results of the computation of the estimate of VNO.

The computation of VNO by the microprocessor is executed permanently, during such time as the computer has voltage applied to it, but only when the speed of the vehicle exceeds a predetermined threshold. In order to achieve this, the device according to the invention comprises a sensor of the speed of the vehicle (6) which delivers a speed signal to the microprocessor. The latter compares the value of this signal with a predetermined minimum value in order, where appropriate, to trigger means for interrupting the computations This leads to the elimination of the positions of the steering wheel when stopped and at low speed, which are statistically not at a zero mean value When the computer does not have voltage applied to it, the non-volatile memory (4) does, however, retain the last VNO value present in the memory, for a subsequent resumption of the computations.

The computation of VNO is executed by means of a program executed by the microprocessor. Reference will be made hereinbelow to FIG. 3 of the drawing, which represents the organigram of this program, to explain the process of determination of VNO according to the invention, which is implemented by means of this program and of the device of FIG. 1.

The acquisition by the microprocessor of the value VX is undertaken at time intervals T which are constant and which are measured by means of a time counter associated with the microprocessor, in such a manner that the microprocessor computes the integral:

$$S = \Sigma\, PVi$$

during a predetermined period of time $D = N \times T$ with $$PVi = VXi - VNO$$

$VXi$ = Value of the i-th sample of VX, i adopting all the integral values from 1 to N, N = number of steps of computations during the period of time D.

At the end of this period of time of computation D, the microprocessor compares S with a predetermined value So, the value of which will be specified hereinbelow.

If S>So, the value of VNO utilized in the computation is considered as too small.

If S< −So, the value of VNO utilized in the computation is considered as too large.

In both of these cases, the microprocessor commands an incrementation (if S>So) or a decrementation (if S< −So) of the VNO value contained in the memory 4.

If −So<S< +So, the VNO value contained in this memory is not modified.

The decision concerning modification or concerning non-modification of the stored VNO value being executed, the computation is resumed in an iterative manner as described hereinabove, with respect to the last N samples of VXi which have been received by the microprocessor, with the aid of the possibly updated value of VNO placed in memory. This value is then utilized as representing the new reference position of the steering wheel.

The organigram of FIG. 3 illustrates the progression of the computation executed by the microprocessor. At the instant t=0 of the start of the computation, a sample counter is set to n=0 while the sum S is also set to zero. A time counter is activated in order to trigger at t=T the conversion of the signal of the sensor by the converter 5 and the acquisition by the microprocessor of a digital value VX representing the value of the signal at the instant T. Also, at t=T, the time counter is reset to t=0. The microprocessor then computes PV and the sum S and increments the count n. The acquisition of VX and the computations set forth hereinabove are repeated until n=N. The sum S is then compared with So and −So and a decision concerning incrementing or concerning decrementing VNO is then taken before the possible loading into memory 4 of an updated VNO value.

The type of correction to be made to VNO is to be adapted as a function of various parameters associated with the conditions of utilization of the vehicle. According to the invention, for a tourist vehicle, a preferred value of So is So=N, which corresponds to the minimum error with respect to the sum S, on account of the summation of N differences $PV_i = VX_i − VN_o$, each exhibiting an accuracy of 1 digital step.

A correction of the type: incrementation of VNO by one unit if S>N or decrementation of VNO by one unit if S< −N proceeds to a good convergence and a good stability of VNO, even in the case of driving on a sinuous route.

In one example of the implementation of the process according to the invention, satisfactory results were obtained with the following values:

T=30 ms; D=2 min; N=4,000

The choice of So results from a compromise between the need for a rapid correction of VNO and the desirable characteristic of a minimum stability for the latter.

By virtue of the present invention, the mechanical mounting of the position sensor is very much simplified. In fact, there is no need at all to regulate mechanically, with precision, the position of the sensor in relation to a reference position or "zero" of the sensor. An approximate regulation is sufficient, because it is by the process according to the invention that the reference position will be determined, and updated, with precision.

It is certainly the case that the invention is not limited to the determination of VNO by summation of differences $VX_i − VNO$ as described hereinabove. It is possible to contemplate other processes of computation. By way of example, reference is made to the digital filtering by which the VNO value is computed at regular time intervals T, a value $VNO_n$ of VNO at the instant $n \times T$ being computed by a relation of the type:

$$VNO_n = (VX_n + p \times VNO_{n-1})/(p+1)$$

p being a factor which depends upon the time constant of the filter, this relation establishing a filtering of the first order. This type of computation favors the rapidity of the convergence, at the expense of the stability of VNO. Higher-order filters can likewise be contemplated.

It is also possible to utilize a stochastic analysis of the distribution of the VXi values in order to deduce therefrom a mean VNO value or the method of least squares in order to find the VNO value which minimizes the expression:

$$\Sigma(VX_i − VNO)^2$$

which contains the last N VXi values acquired by the computer.

By way of a variant of the process for the determination of VNO described hereinabove, it is also possible to control the acquisition by the microprocessor of the value VX at constant intervals of distance traversed by the vehicle (for example at each wheel rotation) and not at constant intervals of time T.

Furthermore, the invention is not limited to the determination of the neutral position of the steering wheel of a vehicle, and extends to the determination of a neutral position of any moving object in movement about a fixed reference position, apart from time drifts.

In the single technological sector of the automobile, it is, in fact, possible to quote, by way of example, the determination of the rest position of the throttle of a carburetor equipped with an angular position sensor, as well as of the maximum value of this angular position corresponding to the maximum opening of the throttle. The values computed in this way are automatically updated during the lifetime of the vehicle; this compensates for any drift due, for example, to the wear of the mechanical components.

It is furthermore possible to quote the determination of the minimum and maximum values of the height of the body of a vehicle equipped with height sensors between wheel hub and chassis.

The sensors which can be used are not limited to potentiometric sensors. Any sensor supplying absolute information can be used, the computation by the microprocessor supplying the absolute value emanating from the sensor corresponding to the physical reference sought. Moreover, any sensor of the incremental type, supplying a sign of variation and associated with a counting-up/counting-down system may, by virtue of the process according to the invention, be utilized to supply information on absolute position, in relation to a physical reference, being a reference associated with a determined value of the counting-up/counting-down device.

We claim:

1. In a microprocessor based control system, a system to update in real time and store the reference position of an oscillating object by measuring its instantaneous position during oscillating movement about this reference position, said device comprising:

first storage means for storing a digital signal indicating the reference position of the object, a sensor responding to the movement of the object for generating a sensor signal representing the instantaneous position of the object, means responsive to the object for generating a control signal, analog to digital converter means responsive to said control signal for converting said sensor signal into a digital sensor signal, second storage means for storing a predetermined number of successive said digital sensor signals, integration means receiving each of said digital sensor signals for producing a difference signal representing a deviation from said stored reference position digital signal in said first storage means, accumulation means receiving said difference signals and generating an error signal representing the change in the reference position of the object, means to combine said error signal with said stored reference position digital signal for creating a new reference position digital signal, and means for transferring said new reference position digital signal to said first storage means.

2. The system as claimed in claim 1, wherein said first storage means comprises a non-volatile memory.

3. The system as claimed in claim 1, wherein said sensor responds to the angular reference position of the steering wheel of a vehicle, said means responsive, generates a signal responsive to the sped of the vehicle such that when the speed is less than a predetermined speed the digital signal representing the reference position stored in the first storage means is not changed.

4. The system as claimed in claim 3, wherein said means responsive to the object for generating a control signal responds to constant intervals of distance traversed by the vehicle.

5. A method to update in real time and store the reference position of an oscillating object by measuring its instantaneous position during oscillating movement about this reference position, said method comprising the steps of:

storing in a first storage, a digital signal representing a predetermined reference position of an object;

sensing the movement of the object;

generating a sensor signal representing the magnitude of the instantaneous movement of the object;

responding to the object for generating a control signal;

converting in response to said control signal said sensor signal into a digital sensor signal;

storing in a second storage means a predetermined number of successive said digital sensor signals;

integrating each of said digital sensor signals for producing a difference signal representing a deviation from the stored reference position digital signal;

accumulating a plurality of said difference signals;

generating in response to said accumulated difference signals an error signal representing the change in the reference position of the object;

adding said error signal and said stored reference position digital signal for creating a new real time reference position digital signal; and then storing said new real time reference position digital signal in the first storage.

6. The system as claimed in claim 5, wherein said step of sensing determines the angular reference position of the steering wheel of an automobile vehicle, the step of responding generates a signal responsive tot he speed of the vehicle such that when the speed is less than a predetermined speed the digital signal representing the reference position which is stored in the first storage is not changed.

7. The system as claimed in claim 5, wherein said the steps of integrating and accumulating, digital filtering of each of said digital sensor signals is employed.

* * * * *